United States Patent [19]
Lissotschenko et al.

[11] Patent Number: 5,852,699
[45] Date of Patent: Dec. 22, 1998

[54] FIBER OPTICAL LIGHT TRANSMISSION DEVICE FOR TRANSMITTING ENERGY

[76] Inventors: Vitaly Lissotschenko, Solbergweg 54, 44225 Dortmund; Joachim Hentze, Im Welandsborn 15, 33189 Schlangen, both of Germany

[21] Appl. No.: 862,186

[22] Filed: May 23, 1997

[30]  Foreign Application Priority Data

Sep. 3, 1996 [DE] Germany .................. 196 35 499.4

[51] Int. Cl.[6] .................................................. G02B 6/04
[52] U.S. Cl. .................................................. 385/115; 385/33
[58] Field of Search .......................... 385/33–35, 88–89, 385/115–116, 119, 1–2

[56]  References Cited

U.S. PATENT DOCUMENTS

| | | | |
|---|---|---|---|
| 5,037,173 | 8/1991 | Sampsell et al. ............... | 385/24 X |
| 5,241,612 | 8/1993 | Iwama ............................ | 385/74 |
| 5,276,758 | 1/1994 | Hughes .......................... | 385/116 |
| 5,377,287 | 12/1994 | Lee et al. ....................... | 385/35 |
| 5,566,262 | 10/1996 | Yamane et al. ................. | 385/33 |
| 5,680,492 | 10/1997 | Hopler et al. .................. | 385/34 |

*Primary Examiner*—John D. Lee
*Attorney, Agent, or Firm*—Collard & Roe, P.C.

[57]  ABSTRACT

A light transmission device, and particularly a fiber optical light transmission system for transmitting energy, has a light conducting fiber bundle formed by a plurality of light conducting fibers, and with at least one coupling element for coupling or decoupling a bundle of light rays focused on the bundle of light conducting fibers. In order to avoid energy overloading of the individual light conducting fibers, and to increase the efficiency of the energy transmission, each coupling element has a coupler array having a plurality of light focusing cells. The coupler array of light focusing cells will focus an incident bundle of light rays multiple times on the light conducting cross section of each of the light conducting fibers of the light conducting fiber bundle.

18 Claims, 2 Drawing Sheets

FIBER OPTICAL LIGHT TRANSMISSION DEVICE FOR TRANSMITTING ENERGY

BACKGROUND OF THE INVENTION

1. Field of the Invention

The present invention relates to a light transmission device, and in particular to a fiber-optical light transmission system for transmitting energy, comprising a bundle of light conducting fibers formed by a plurality of light conducting fibers, and at least one coupling element for coupling or decoupling a bundle of light rays, and this coupling element being positioned on the bundle of light conducting fibers.

2. The Prior Art

Fiber optical light transmission devices are used wherever the light emitted by a light source has to be transmitted to a specified location. The application possibilities for using these devices range from the transmission of modulated low-energy signals used in communications technology, to transmitting light ray bundles of high energy density, for example high-energy laser beams for treating materials and for medical applications.

Light transmission systems, in which light is transmitted by light conducting fibers, are characterized, on the one hand, by good transmission properties, for example a low loss of energy. Also, on the other hand, these light conducting fibers are mechanically flexible to such an extent that it is possible with their help to also transmit light into locations that are otherwise poorly accessible. The applications of these systems, therefore, range from optical data transmission to endoscopic light devices in medical technology.

Incoming light from a light source may be coupled to a light conducting fiber by focusing the light source on one end of the fiber; i.e., focusing on an entrance end surface face of the light conducting fiber. At the other end of the light conducting fiber, the light exits from the fiber via the exit surface face as well, whereby decoupling elements are connected in series, if need be, for example collimators or the like.

Since only low-energy light signals are used in communications technology, these low energy light signals can be transmitted without problems by means of one single light conducting fiber, for example a monomode glass fiber or a multimode glass fiber. However, problems arise with the transmission of higher energy light signals, for example for treating materials or in surgery. This is because only a limited amount of energy is transmittable by means of one single light conducting fiber, which has an energy load limit which, when exceeded, leads to damage to the fiber or leads to destruction of the fiber. High energy light signals, therefore, have to be distributed between a plurality of several light conducting fibers, which, as a rule, are combined into one fiber bundle.

For coupling the light into such a bundle of light conducting fibers, it is common practice heretofore according to the state of the prior art to reproduce a light source, for example, a high-energy laser on the surface end face of the fiber bundle via coupling elements such as capacitor systems or the like, i.e., to focus it on this end face. It is not always possible in this way to assure that the energy density averaged across the cross section of the bundle of light conducting fibers will not exceed the critical value for each fiber. However, the energy density across the surface cross section of the light ray bundle is, as a rule, not distributed homogeneously, so that local variations may lead to overloading and damage to individual light conducting fibers of the fiber bundle. It is evident that due to such damage, a bundle of light conducting fibers is no longer usable after only a short time in service. Alternatively, it would be possible to use a bundle of light conducting fibers with a larger cross section, in which the average energy density per fiber could be reduced. However, such an alternative construction would require additional focusing systems for coupling light to, or for decoupling the light energy from the fiber bundle, which, of course, would require considerable financial expenditure.

Another problem in the prior art is due to the fact that even when the fibers in the fiber bundle are densely packed, unavoidable intermediate spaces remain between the fibers. In addition, only the light entering into the core zone of the surface of light conducting fiber is transmitted further. As a consequence, not all of the entire light aimed at the surface face of a bundle of light conducting fibers is in fact transmitted, so that the overall efficiency is significantly reduced.

SUMMARY OF THE INVENTION

It is an object of the present invention to provide a solution to the aforementioned problems, which solution is to avoid damage to individual fibers in the transmission of high energy densities with a bundle of light conducting fibers, and to enhance the efficiency of the energy transmission.

The above object is accomplished according to the present invention by providing a coupling element which has a coupler array with a plurality of focusing cells, which focuses an incident light ray bundle multiple times. Specifically each one of the focusing cells will focus light in each case on the light conducting cross section of each one of the light conducting fibers of the bundle of light conducting fibers.

The coupler array, which, according to the invention, is integrated into the coupling element, also has optical elements, for example lenses. These lenses are preferably arranged in the form of a raster or matrix array which is symmetrically positioned around a longitudinal axis of rotation; and these optical elements taken as a whole define a plurality of cells. The optical system of each cell is preferably constructed in such a way that the total cross section, or at least a large part of the cross section of the incident bundle of light rays is focused on the inlet area or is focused after leaving the outlet area of a light conducting fiber. The spacing between the ends of the light conducting fibers and the coupler array is adjusted in such a way that the light ray focused by each optical system or individual lens optimally illuminates in each case the light conducting cross section of an individual light conducting fiber.

A special advantage of the light transmission device according to the invention results from the fact that the incident light is optimally distributed by the coupler array to the individual light conducting fibers of a bundle of light conducting fibers. It is assured in this way that the light energy received is uniformly distributed to all of the individual fibers of the fiber bundle. Such homogenization of the light energy will prevent damage to individual fibers due to energy overloading of the individual fiber.

Another advantage of the present invention is due to the fact that each one of the light conducting fibers is individually acted upon by a corresponding single optical cell, or lens, of the coupler array. This makes it possible to focus the light energy per cell exclusively on the central, light conducting zone on the surface at the end of an individual light conducting fiber. This means that no light energy is absorbed and is thusly no longer usable due to absorption in the insensitive marginal zones of a light conducting fiber. Also, no light energy is lost in the intermediate empty space between the light conducting fibers in the bundle of light conducting fibers. The energy transmission efficiency is considerably increased in this way as compared to fiber optical light transmitting devices according to the state of the prior art.

In a further embodiment, provision is made according to the invention that the coupler array has an array of lenses, in which an end of a light conducting fiber is positioned in each case in the longitudinal axial direction in front of a specific or corresponding lens. Here, the lens array has a plurality of lenses preferably arranged in the form of a matrix screen or raster which is symmetrically positioned around a longitudinal axis of rotation. Each lens forms a cell. Each individual lens of the array can be constructed either spherically, i.e., as a spherical shaped lens, or aspherically, which is aspherical in shape for correcting any possible spherical aberration. Preferably, each lens reproduces the total cross section of the light ray, or at least the greater part thereof on the light conducting end area of a light conducting fiber on the end surface of the light conducting fiber bundle.

In a preferred embodiment of the light transmission device according to the invention, the coupler array has two spaced apart cylindrical lens arranged one after the other in the longitudinal direction of the light rays. The two cylindrical lens arrays, which either are composed of separate individual lenses or are constructed in each case as a monolithic structural element, form a homogenizer, if need be, with an additional lens connected upstream thereof. In this embodiment, a cell is formed in each case at the point of intersection of the two cylindrical lenses. As in the embodiment described above, the incident bundle of light rays is reproduced in each case on the end of an individual light conducting fiber in the direction of the longitudinal axis, wherein this axis is extending through the center of the lens and the center of the fiber.

In the embodiments described above, the coupler arrays are preferably constructed to be monolithic elements. Such monolithic elements have the advantage that they can be readily manufactured in one piece by modern manufacturing techniques with high accuracy. Consequently, the individual lenses are thereby prevented from getting out of alignment or adjustment relative to one another. The adjustment expenditure in the manufacture of the light transmission system is reduced in this way as well.

In a further embodiment of the invention, the coupling elements attached to the bundle of light conducting fibers create a ray-forming system. Thus, in this embodiment, a first coupling element with a coupler array according to the invention is arranged only as a coupling element in the inlet of the bundle, or as a second decoupling element in the outlet, respectively, of the bundle of light conducting fibers. As a result, the bundle of light conducting fibers readily forms a ray-forming system, by which the desired beam parameters are provided. Thus, it is possible in this way, for example, to create a Gaussian intensity distribution profile, because this profile is frequently required for material treating application or for medical applications. It is also possible that a coupling element according to the invention can be attached to both the inlet and outlet of the bundle of light conducting fibers. As a result, the coupler arrays, if need be, with additional optical elements such as collimator lenses or the like, jointly create a beam-forming system, with which the intensity distribution or profile and/or the cross section of the beam can be predetermined in nearly any desired way.

Whether one or two coupling elements with coupler arrays according to the invention are arranged on the inlet and/or outlet of the bundle of light conducting fibers depends on the objective purpose of the application of the respective light transmission system. For example, in order to distribute a bundle of high energy light rays to a number of work sites, for example from a high-energy stationary laser, a coupling element according to the invention is positioned in front of the inlet of the bundle of light conducting fibers. The outlets of the individual light conducting fibers are flexibly positioned either individually or as partial bundles which are placed in different locations depending upon the type of application. Of course, coupling elements according to the invention can also be positioned as decoupling elements, if required, at the outlet ends of such individual optical fibers or partial bundle of fibers. Partial bundles of optical fibers include a few fibers, but not all of the optical fibers, which are bundled together.

In another embodiment of the invention, the light conducting fibers of the fiber bundle are mounted before the coupler array in a fiber holder. In the fiber holder, the individual fibers are mounted and fixed in the arrangement predetermined by the coupler array. In this embodiment, the inlet and outlet areas of the light conducting fibers are optimally arranged in front of the coupler array, so that getting out of adjustment, which could lead to uneven illumination of the light conducting fiber bundle is prevented to the greatest possible extent. For this purpose, the fiber holder, which, for example, is constructed as an array of holes having the same raster measurement as a matrix-like coupler array, is rigidly connected with the coupler array.

If the fiber holder is constructed in the form of an array of holes corresponding with the lens in the cells of the coupler array, it can be manufactured in a particularly useful way at a low cost, and it is easy to handle. It can be practically manufactured, for example by providing a board having the raster arrangement for the coupler array by having a great number of parallel boreholes, into which the ends of the individual light conducting fibers are plugged and attached, for example by gluing, welding or the like.

Furthermore, the coupling element preferably has an optical modulator. Such modulators may be, for example, beam shutters, masks, or also electrooptical modulators permitting controlled influencing of the beam parameters.

The possibilities for influencing the beam geometry and the energy intensity distribution profile are expanded further by associating an electrooptical modulator in each case with one cell of the coupler array. The energy transmitted per light conducting fiber is adjustable in this way in a controlled manner, so that the energy distribution or profile of the outlet beam, for example, can be predetermined in a defined way.

It is a further embodiment that the coupling element according to the invention be integrated into a plug connector. This structure facilitates handling in that, for example, different light transmission systems can be used without problems with different light sources by means of the plug connector. Furthermore, extension lines can be provided using this construction in a simple manner.

As used herein, the term "raster" means that the elements within a matrix, or an array, are arranged according to a predetermined pattern of parallel lines, which may be closely spaced together, and which may be horizontal, vertical, or diagonal.

BRIEF DESCRIPTION OF THE DRAWINGS

Other objects and features of the present invention will become apparent from the following detailed description considered in connection with the accompanying drawing which discloses several embodiments of the present invention. It should be understood, however, that the drawing is designed for the purpose of illustration only and not as a definition of the limits of the invention.

In the drawing, wherein similar reference characters denote similar elements throughout the several views.

DETAILED DESCRIPTION OF PREFERRED EMBODIMENTS

Figure 1:
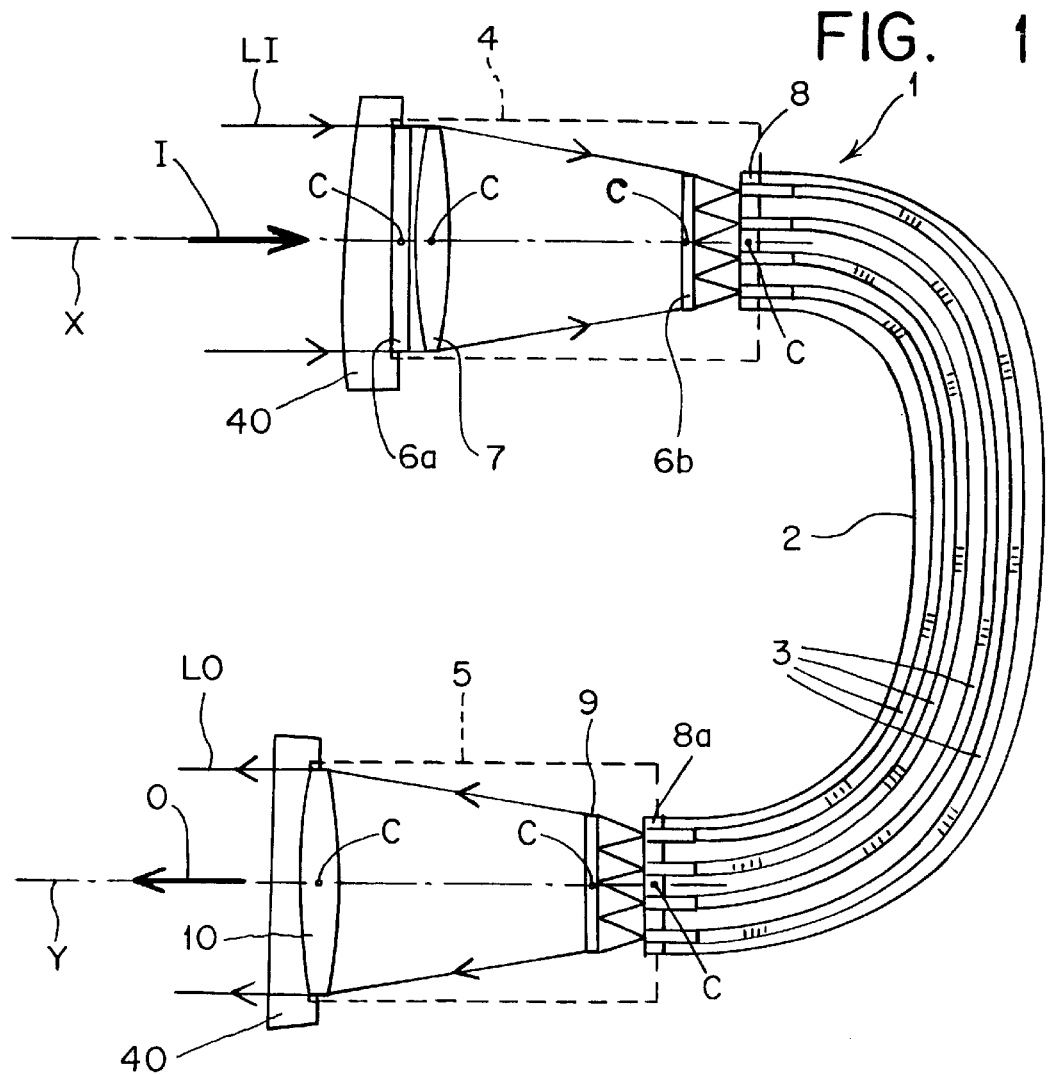
FIG. 1 shows a schematic sectional view of a light transmission system according to the invention.

Turning now in detail to the drawings, FIG. 1 shows the light transmission system or device as a whole denoted by reference numeral 1. It includes a light conducting fiber bundle 2, which is formed by a plurality of individual light conducting fibers 3, along with having a coupling element 4 mounted at the input end of the fibers as well as a decoupling element 5 mounted at the output end of the fibers.

The coupling element 4 has the two parallel positioned cylinder shaped lens arrays 6a and 6b positioned a spaced distance apart and located one after the other. These arrays jointly form a coupler array 6a/b. Lens coupler array 6a has a larger diameter than lens array 6b, while lens coupler array 6b is closer to the light conducting fibers 3 than is lens array 6a which is farther away from fibers 3. Two coupler arrays can form two crossed cylindrical lens arrays. Also two coupler arrays can form two parallel cylindrical lens arrays positioned one behind the other and turned 90° relative to each other.

As shown in FIG. 1, a parallel or approximately parallel bundle of incoming light rays LI can be transmitted into the cylinder lens array 6a, for example from a laser, which is indicated by the arrow I. The incoming light rays LI are parallel to the longitudinal axis X of coupling element 4. A lens 7 is arranged adjacent to the cylinder lens array 6a and between arrays 6a and 6b. This lens 7 narrows the cross section of the beam passing through 6a to the area of the smaller cylinder lens array 6b. Lens array 6a, lens 7, and lens array 6b are each perpendicular to the longitudinal axis X of the inlet side of the fiber bundle 2. Lens 7 can be an optical modulator, or an electrooptical modulator for the coupling element, or for each one of the light focusing cells 11.

In the direction of the incoming beam LI and behind the coupler array 6a/b, i.e., in the direction of the beam LI after the second cylinder lens array 6b, is located a fiber holder 8. This inlet fiber holder 8 is preferably constructed as an array of holes, whereby a great number of holes, which are not shown in FIG. 1, are arranged in the raster order predetermined by the matrix-like coupler array 6b. The ends of the individual light conducting fibers 3 of the light conducting fiber bundle 2 are fixed in the bore holes of holder 8 in such a way that the inlet cross section of each fiber 3 is positioned in the area of focus of the coupler array 6b. Inlet side fiber holder 8 is also perpendicular to longitudinal axis X of the inlet side.

On the outlet side of device 1 is the outlet side fiber holder 8a which is mounted on the end of the light conducting fiber bundle 2. The outlet fiber holder 8a, however, is connected with the decoupling element 5. In the decoupling element 5, a decoupler array 9 is positioned downstream of holder 8a but is adjacent to the outlet fiber holder 8a. This decoupler array 9 is constructed as a cylindrical monolithic lens array, of which the individual lenses are placed in the same raster order as the corresponding individual fibers in the boreholes in the outlet side fiber holder 8a. Outlet side fiber holder 8a and the decoupler array 9 are each perpendicular to the outlet side longitudinal axis Y.

On the outlet side, a collimator lens 10 is located in the decoupling element 5 in the downstream direction of the beam after the decoupler array 9. This collimator lens 10 produces a parallel beam from the divergently exiting outlet side light bundle of rays LO. The outlet side, exiting, parallel or approximately parallel bundle of light rays LO is indicated by an arrow O. Lens 10 is also perpendicular to the outlet side longitudinal axis Y.

In order to assure the correct alignment of all the individual elements 6a, 7, 6b, and 8 of coupling element 4, the inlet side longitudinal axis X passes through the center C of each of these elements 6a, 7, 6b and 8, and is perpendicular to each element. In order to assure the correct alignment of all the individual elements 10, 9, and 8a of the decoupler element 5, the outlet side longitudinal axis Y passes through the center C of each of these elements 10, 9, and 8a, and is perpendicular to each element.

Figure 2:
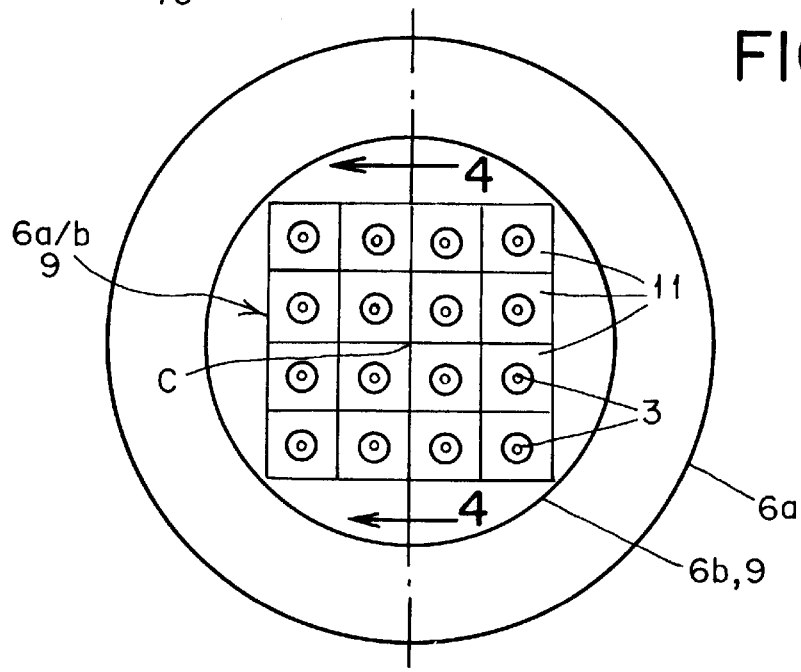
FIG. 2 shows a front plan view of a coupler array according to the invention in the longitudinal direction of the energy beam.

FIG. 2 schematically shows a front plan view of the coupler arrays 6a or 6b and 9, respectively, as seen in the direction of the beam LI or LO, with the faces of the ends of the individual light conducting fibers 3 positioned behind these arrays.

Coupling element 4 shows the use of two coupler arrays 6a and 6b, while decoupling element 5 shows the use of only one decoupler array 9.

Figure 3:
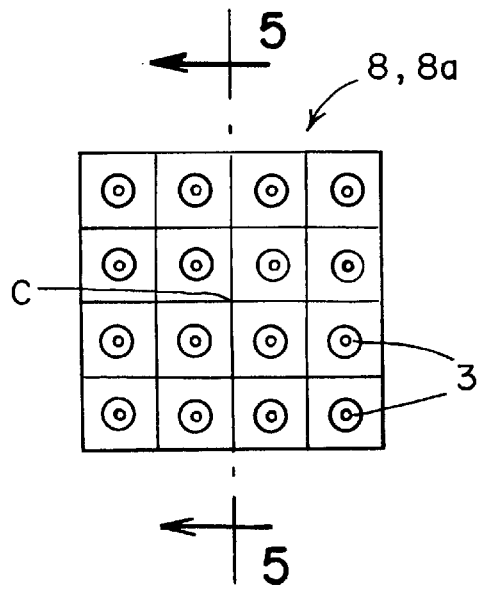
FIG. 3 shows a front plan view of the fiber holder of the invention.

FIG. 3 shows in a particularly clear representation the raster-like arrangement of the light conducting fibers 3 in the unique fiber holder 8 or 8a of the invention. FIG. 2 shows that the arrangement of fibers 3 corresponds in each case with the arrangement of light focusing cells 11 in array 6b, whereby each cell 11 or lens 11 focuses a portion of light LI onto one corresponding fiber 3, for array 6b. Conversely, the light LO exiting each fiber 3 of outlet side fiber holder 8a is focused onto its corresponding cell or lens 11 in decoupler array 9.

FIG. 3 shows the inlet fiber holder 8 and the outlet fiber holder 8a. Holders 8 and 8a are each perpendicular to the longitudinal axis X or Y respectively which passes through the center C thereof.

Figure 4:
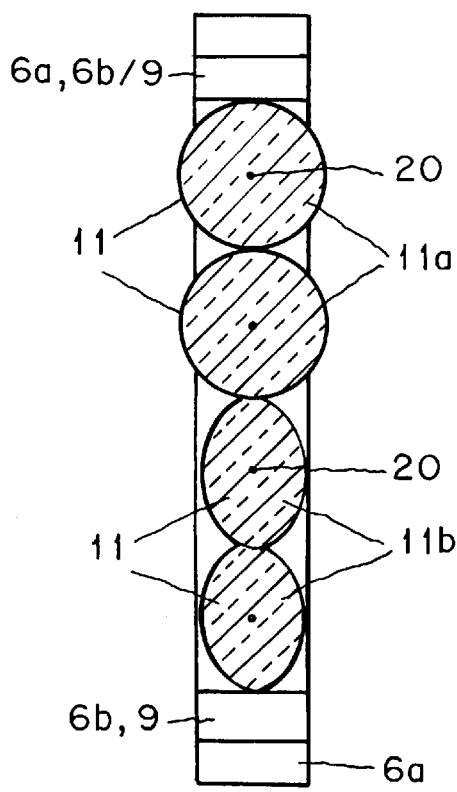
FIG. 4 shows a cross section view of the lens array along section line 4—4' of FIG. 2.

FIG. 4 shows a cross section view along line 4—4' of FIG. 2 of the coupler array 6a or 6b or 9 in which four lens elements 11 are held firmly rigidly in a fixed position by the coupler array. Lenses 11 are stacked vertically one above the other with the center of each 20 in vertical alignment. FIG. 4 shows that some lenses may be spherical 11a and other lenses may be aspherical 11b..

Figure 5:
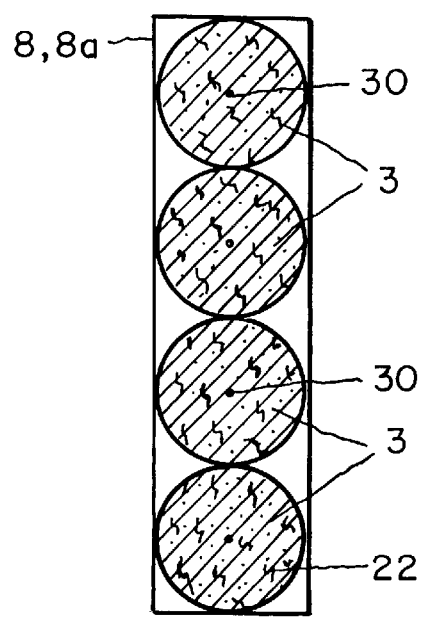
FIG. 5 shows a cross section view of the fiber holder along section line 5—5' of FIG. 3.

FIG. 5 shows a cross section view of the fiber holder 8 or 8a taken along line 5—5' of FIG. 3 which shows how the end faces 22 of each fiber 3 is firmly rigidly held by the fiber holder. Fibers 3 are stacked vertically one above the other with the center 30 of each in vertical alignment.

Preferably the centers 20 of each lens 11 is aligned with the centers 30 of each fiber such that the light energy focused by each lens 11 is focused on the center 30 of each corresponding fiber 3 for maximum efficiency of the device.

A plug connector 40 may be integrated onto coupling element 4 or decoupling element 5.

The advantages of the light transmission system 1 of the invention result from the fact that by means of the coupler array 6a/b within the coupling element 4, the light energy is uniformly distributed to the individual light conducting fibers 3 of the light conducting fiber bundle 2. This positive result will occur in spite of an uneven intensity distribution or profile of the incident light ray bundle LI in a certain case. In this way, overloading of individual light conducting fibers 3 is prevented so that damage to the fibers 3 is also prevented.

A further advantage is that the incident bundle of rays LI is focused via the coupler array 6a/b and the lens 7 on the inlet areas of the light conducting fibers 3; and these fibers 3 are attached within the fiber holder 8 in such a way that an excellent transmission efficiency is the result achieved.

A beam-creating system is jointly formed with the decoupling element 5, which contains the decoupler array 9 as well as lens 10. This permits the light transmission system of the invention to be modified and varied in order to satisfy the requirements of providing a light beam with defined parameters.

The transmission system 1 according to the invention overall permits optimal utilization of a light conducting fiber bundle 2 in the transmission of high energy light.

While several embodiments of the present invention have been shown and described, it is to be understood that many changes and modifications may be made thereunto without departing from the spirit and scope of the invention as defined in the appended claims.

What is claimed is:

1. A fiber optical light transmission device for transmitting energy, comprising
    a bundle of light conducting fibers formed by a plurality of light conducting fibers, each fiber having a light conducting cross section area;
    a coupling element positioned adjacent to said bundle of fibers for transmitting an incoming incident bundle of light rays;
    said coupling element having two coupler arrays, and each coupler array having a plurality of light focusing cells, and each coupler array focusing said incoming incident bundle of light rays multiple times using said plurality of light focusing cells;
    each coupler array comprising a cylindrical lens array such that said two coupler arrays form two crossed cylindrical lens arrays; and
    each light focusing cell of said plurality of light focusing cells focusing said light rays on said light conducting cross section area within each corresponding light conducting fiber for a light conducting fiber bundle.

2. Device according to claim 1,
    wherein each of said two coupler arrays has a lens array;
    said lens array comprising a light focusing lens within each light focusing cell; and
    an end of each light conducting fiber is positioned adjacent to the corresponding light focusing lens in the downstream axial direction therefrom.

3. Device according to claim 2,
    wherein each light focusing cell has a spherical light focusing lens.

4. Device according to claim 2,
    wherein each light focusing cell has an aspherical light focusing lens.

5. Device according to claim 1,
    wherein the light focusing cells are positioned in each of the two coupler arrays in the form of a raster.

6. Device according to claim 1,
    wherein the light focusing cells are positioned in each of the two coupler arrays symmetrically around a longitudinal axis of rotation of the coupling element.

7. Device according to claim 1,
    wherein each of the two coupler arrays has cylinder lens arrays positioned one after the other in the longitudinal direction of the bundle of light rays.

8. Device according to claim 1,
    wherein one coupler array comprises a monolithic element.

9. Device according to claim 1,
    wherein the coupling element forms a beam-forming system.

10. Device according to claim 1,
    wherein said coupling element having said two coupler arrays is positioned at an inlet end of the light conducting fiber bundle.

11. Device according to claim 1, further comprising
    a decoupling element with a decoupler array having a plurality of light focusing cells positioned downstream of an outlet end of the light conducting fiber bundle.

12. Device according to claim 11, further comprising
    a fiber holder for mounting the light conducting fibers of the light conducting fiber bundle in front of the decoupler array.

13. Device according to claim 12,
    wherein the fiber holder comprises an array of holes corresponding in position with the light focusing cells of the two coupler arrays.

14. Device according to claim 1, further comprising
    an optical modulator for the coupling element.

15. Device according to claim 1, comprising
    an electrooptical modulator for each one of the light focusing cells of the two coupler arrays.

16. Device according to claim 1, further comprising
    a plug connector within which the coupling element is integrated.

17. Device according to claim 1,
    wherein one coupler array has a larger diameter than another coupler array which has a smaller diameter; and
    wherein said one coupler array is farther away from said light conducting fibers than is said another coupler array.

18. Device according to claim 1,
    wherein said two coupler arrays form two parallel cylindrical lens arrays positioned one behind the other and turned 90° relative to each other.

* * * * *